(12) United States Patent
Hazlehurst et al.

(10) Patent No.: US 8,261,334 B2
(45) Date of Patent: Sep. 4, 2012

(54) SYSTEM FOR PERFORMING WEB AUTHENTICATION OF A USER BY PROXY

(75) Inventors: Peter Hazlehurst, Foster City, CA (US); Matthew Aman, San Mateo, CA (US); Doug Diego, Redwood City, CA (US)

(73) Assignee: Yodlee Inc., Redwood City, CA (US)

( * ) Notice: Subject to any disclaimer, the term of this patent is extended or adjusted under 35 U.S.C. 154(b) by 944 days.

(21) Appl. No.: 12/109,787

(22) Filed: Apr. 25, 2008

(65) Prior Publication Data

US 2009/0271854 A1  Oct. 29, 2009

(51) Int. Cl.
*H04L 9/32* (2006.01)
*G06F 21/00* (2006.01)
(52) U.S. Cl. ............. 726/7; 713/186; 715/501; 709/224
(58) Field of Classification Search ....... 726/7; 713/186
See application file for complete search history.

(56) References Cited

U.S. PATENT DOCUMENTS

| | | |
|---|---|---|
| 4,727,243 A | 2/1988 | Savar |
| 4,987,538 A | 1/1991 | Johnson et al. |
| 5,220,501 A | 6/1993 | Lawlor et al. |
| 5,237,499 A | 8/1993 | Garback |
| 5,318,007 A | 6/1994 | Afshar |
| 5,340,537 A | 8/1994 | Barrett |
| 5,347,632 A | 9/1994 | Filepp et al. |
| 5,423,033 A | 6/1995 | Yuen |
| 5,446,891 A | 8/1995 | Kaplan et al. |
| 5,459,306 A | 10/1995 | Stein et al. |
| 5,481,672 A | 1/1996 | Okuno et al. |
| 5,483,445 A | 1/1996 | Pickering |
| 5,537,314 A | 7/1996 | Kanter |
| 5,590,196 A | 12/1996 | Moreau |
| 5,611,048 A | 3/1997 | Jacobs et al. |
| 5,613,012 A | 3/1997 | Hoffman et al. |

(Continued)

FOREIGN PATENT DOCUMENTS

EP 0747843 12/1996

(Continued)

OTHER PUBLICATIONS

Zhao, Y., "A Single Login Web Service Integrator—Web Entrance," Mar. 15, 2004.

(Continued)

*Primary Examiner* — Jeffrey Pwu
*Assistant Examiner* — Samuel Ambaye
(74) *Attorney, Agent, or Firm* — Donald R. Boys; Central Coast Patent Agency, Inc.

(57) ABSTRACT

A data gathering system is guided by an Internet-capable appliance associated with a user, which has a Pin Vault software instance executing from a digital memory media coupled to the appliance and a Pin Vault file stored in a data repository coupled to the appliance. The Pin Vault file comprises data for authenticating the user to one or more web sites storing information of interest to the user, and the Pin Vault software cooperates with an Internet service to provide, from the Pin Vault, data as needed by the Internet service to log onto and authenticate as the user at the one or more web sites storing information of interest to the user, to gather information on behalf of the user. The data for authentication is never kept at the Internet service.

26 Claims, 5 Drawing Sheets

U.S. PATENT DOCUMENTS

| | | | |
|---|---|---|---|
| 5,619,648 A | 4/1997 | Canale et al. | |
| 5,619,716 A | 4/1997 | Nonaka et al. | |
| 5,634,127 A | 5/1997 | Cloud et al. | |
| 5,640,577 A | 6/1997 | Scharmer | |
| 5,644,576 A | 7/1997 | Bauchot et al. | |
| 5,649,118 A | 7/1997 | Carlisle et al. | |
| 5,649,186 A | 7/1997 | Ferguson | |
| 5,655,089 A | 8/1997 | Bucci | |
| 5,696,965 A | 12/1997 | Dedrick | |
| 5,699,528 A | 12/1997 | Hogan | |
| 5,701,451 A | 12/1997 | Rogers et al. | |
| 5,706,442 A | 1/1998 | Anderson et al. | |
| 5,708,825 A | 1/1998 | Sotomayor | |
| 5,710,887 A | 1/1998 | Chelliah et al. | |
| 5,710,918 A | 1/1998 | Lagarde et al. | |
| 5,712,979 A | 1/1998 | Graber et al. | |
| 5,717,923 A | 2/1998 | Dedrick | |
| 5,721,908 A | 2/1998 | Lagarde et al. | |
| 5,724,567 A | 3/1998 | Rose et al. | |
| 5,724,595 A | 3/1998 | Gentner | |
| 5,727,156 A | 3/1998 | Herr-Hoyman et al. | |
| 5,732,074 A | 3/1998 | Spaur et al. | |
| 5,740,365 A | 4/1998 | Pfeiffer et al. | |
| 5,740,549 A | 4/1998 | Reilly et al. | |
| 5,745,754 A | 4/1998 | Lagarde et al. | |
| 5,745,884 A | 4/1998 | Carnegie et al. | |
| 5,752,246 A | 5/1998 | Rogers et al. | |
| 5,758,577 A | 6/1998 | Kleewin et al. | |
| 5,768,521 A | 6/1998 | Dedrick | |
| 5,778,367 A | 7/1998 | Wesinger, Jr. et al. | |
| 5,778,368 A | 7/1998 | Hogan et al. | |
| 5,787,425 A | 7/1998 | Bigus | |
| 5,790,789 A | 8/1998 | Suarez | |
| 5,790,793 A | 8/1998 | Higley | |
| 5,793,964 A | 8/1998 | Rogers et al. | |
| 5,793,966 A | 8/1998 | Amstein et al. | |
| 5,794,233 A | 8/1998 | Rubinstein | |
| 5,796,945 A | 8/1998 | Tarabella | |
| 5,799,151 A | 8/1998 | Hoffer | |
| 5,805,719 A | 9/1998 | Pare, Jr. et al. | |
| 5,812,769 A | 9/1998 | Graber et al. | |
| 5,813,007 A | 9/1998 | Nielsen | |
| 5,815,665 A | 9/1998 | Teper et al. | |
| 5,818,935 A | 10/1998 | Maa | |
| 5,819,284 A | 10/1998 | Farber et al. | |
| 5,825,884 A | 10/1998 | Zdepski et al. | |
| 5,828,839 A | 10/1998 | Moncreiff | |
| 5,832,474 A | 11/1998 | Lopresti et al. | |
| 5,832,494 A | 11/1998 | Egger et al. | |
| 5,835,724 A | 11/1998 | Smith et al. | |
| 5,838,910 A | 11/1998 | Domenikos et al. | |
| 5,838,916 A | 11/1998 | Domenikos et al. | |
| 5,838,918 A | 11/1998 | Prager et al. | |
| 5,842,185 A | 11/1998 | Chancey et al. | |
| 5,845,073 A | 12/1998 | Carlin et al. | |
| 5,848,396 A | 12/1998 | Gerace | |
| 5,854,897 A | 12/1998 | Radziewicz et al. | |
| 5,855,015 A | 12/1998 | Shoham | |
| 5,855,020 A | 12/1998 | Kirsch | |
| 5,860,068 A | 1/1999 | Cook | |
| 5,860,073 A | 1/1999 | Ferrel et al. | |
| 5,862,325 A | 1/1999 | Reed et al. | |
| 5,870,546 A | 2/1999 | Kirsch | |
| 5,870,552 A | 2/1999 | Dozier et al. | |
| 5,875,296 A | 2/1999 | Shi et al. | |
| 5,875,437 A | 2/1999 | Atkins | |
| 5,878,215 A | 3/1999 | Kling et al. | |
| 5,878,219 A | 3/1999 | Vance, Jr. et al. | |
| 5,878,408 A | 3/1999 | Van Huben et al. | |
| 5,884,033 A | 3/1999 | Duvall et al. | |
| 5,884,035 A | 3/1999 | Butman et al. | |
| 5,884,045 A | 3/1999 | Kurihara | |
| 5,887,133 A | 3/1999 | Brown et al. | |
| 5,890,140 A | 3/1999 | Clark et al. | |
| 5,890,152 A | 3/1999 | Rapaport et al. | |
| 5,892,900 A | 4/1999 | Ginter et al. | |
| 5,892,909 A | 4/1999 | Grasso et al. | |
| 5,893,075 A | 4/1999 | Plainfield et al. | |
| 5,893,091 A | 4/1999 | Hunt et al. | |
| 5,893,128 A | 4/1999 | Nauckhoff | |
| 5,894,554 A | 4/1999 | Lowery et al. | |
| 5,895,468 A | 4/1999 | Whitmyer, Jr. | |
| 5,895,838 A | 4/1999 | Harjunmaa et al. | |
| 5,897,620 A | 4/1999 | Walker et al. | |
| 5,897,622 A | 4/1999 | Blinn et al. | |
| 5,898,836 A | 4/1999 | Freivald et al. | |
| 5,901,287 A | 5/1999 | Bull et al. | |
| 5,903,881 A | 5/1999 | Schrader et al. | |
| 5,905,736 A | 5/1999 | Ronen et al. | |
| 5,905,865 A | 5/1999 | Palmer et al. | |
| 5,907,837 A | 5/1999 | Ferrel et al. | |
| 5,907,838 A | 5/1999 | Miyasaka et al. | |
| 5,908,469 A | 6/1999 | Botz et al. | |
| 5,913,202 A | 6/1999 | Motoyama | |
| 5,918,019 A | 6/1999 | Valencia | |
| 5,918,214 A | 6/1999 | Perkowski | |
| 5,920,848 A | 7/1999 | Schutzer et al. | |
| 5,923,736 A | 7/1999 | Shachar | |
| 5,924,090 A | 7/1999 | Krellenstein | |
| 5,926,798 A | 7/1999 | Carter | |
| 5,930,777 A | 7/1999 | Barber | |
| 5,931,907 A | 8/1999 | Davies et al. | |
| 5,931,947 A | 8/1999 | Burns et al. | |
| 5,933,604 A | 8/1999 | Inakoshi | |
| 5,933,811 A | 8/1999 | Angles et al. | |
| 5,933,816 A | 8/1999 | Zeanah et al. | |
| 5,937,168 A | 8/1999 | Anderson et al. | |
| 5,937,392 A | 8/1999 | Alberts | |
| 5,943,424 A | 8/1999 | Berger et al. | |
| 5,948,040 A | 9/1999 | DeLorme et al. | |
| 5,949,326 A | 9/1999 | Wicks et al. | |
| 5,951,637 A | 9/1999 | Kuzma | |
| 5,951,642 A | 9/1999 | Onoe et al. | |
| 5,956,709 A | 9/1999 | Xue | |
| 5,958,008 A | 9/1999 | Pogrebisky et al. | |
| 5,961,593 A | 10/1999 | Gabber et al. | |
| 5,961,601 A | 10/1999 | Iyengar | |
| 5,963,915 A | 10/1999 | Kirsch | |
| 5,963,924 A | 10/1999 | Williams et al. | |
| 5,963,925 A | 10/1999 | Kolling et al. | |
| 5,963,949 A | 10/1999 | Gupta et al. | |
| 5,963,952 A | 10/1999 | Smith | |
| 5,963,964 A | 10/1999 | Nielsen | |
| 5,963,967 A | 10/1999 | Umen et al. | |
| 5,966,441 A | 10/1999 | Calamera | |
| 5,966,697 A | 10/1999 | Fergerson et al. | |
| 5,974,406 A | 10/1999 | Bisdikian et al. | |
| 5,974,430 A | 10/1999 | Mutschler et al. | |
| 5,978,766 A | 11/1999 | Luciw | |
| 5,978,779 A | 11/1999 | Stein et al. | |
| 5,978,780 A | 11/1999 | Watson | |
| 5,978,828 A | 11/1999 | Greer et al. | |
| 5,978,842 A | 11/1999 | Noble | |
| 5,982,891 A | 11/1999 | Ginter et al. | |
| 5,983,170 A | 11/1999 | Goodman | |
| 5,983,200 A | 11/1999 | Slotznick | |
| 5,983,214 A | 11/1999 | Lang et al. | |
| 5,983,227 A | 11/1999 | Nazem et al. | |
| 5,983,268 A | 11/1999 | Freivald | |
| 5,987,440 A | 11/1999 | O'Neil et al. | |
| 5,987,454 A | 11/1999 | Hobbs | |
| 5,987,466 A | 11/1999 | Greer et al. | |
| 5,987,498 A | 11/1999 | Athing et al. | |
| 5,987,611 A | 11/1999 | Freund | |
| 5,990,887 A | 11/1999 | Redpath et al. | |
| 5,991,735 A | 11/1999 | Gerace | |
| 5,991,756 A | 11/1999 | Wu | |
| 5,995,756 A | 11/1999 | Hermann | |
| 5,995,943 A | 11/1999 | Bull et al. | |
| 5,995,965 A | 11/1999 | Experton | |
| 5,996,010 A | 11/1999 | Leong et al. | |
| 5,999,179 A | 12/1999 | Kekic et al. | |
| 5,999,940 A | 12/1999 | Ranger | |
| 5,999,975 A | 12/1999 | Kittaka et al. | |
| 6,000,033 A | 12/1999 | Kelley et al. | |
| 6,000,832 A | 12/1999 | Franklin et al. | |
| 6,003,077 A | 12/1999 | Bawden et al. | |

| | | |
|---|---|---|
| 6,006,227 A | 12/1999 | Freeman et al. |
| 6,006,333 A | 12/1999 | Nielsen |
| 6,009,408 A | 12/1999 | Buchanan |
| 6,009,429 A | 12/1999 | Greer et al. |
| 6,012,087 A | 1/2000 | Freivald et al. |
| 6,014,429 A | 1/2000 | LaPorta et al. |
| 6,014,502 A | 1/2000 | Moraes |
| 6,018,724 A | 1/2000 | Arent |
| 6,023,684 A | 2/2000 | Pearson |
| 6,023,698 A | 2/2000 | Lavey |
| 6,029,175 A | 2/2000 | Chow et al. |
| 6,029,180 A | 2/2000 | Murata et al. |
| 6,029,182 A | 2/2000 | Nehab et al. |
| 6,029,195 A | 2/2000 | Herz |
| 6,029,207 A | 2/2000 | Heninger |
| 6,031,354 A | 2/2000 | Wiley et al. |
| 6,032,162 A | 2/2000 | Burke |
| 6,038,601 A | 3/2000 | Lambert et al. |
| 6,038,603 A | 3/2000 | Joseph |
| 6,038,668 A | 3/2000 | Chipman et al. |
| 6,041,307 A | 3/2000 | Ahuja et al. |
| 6,041,326 A | 3/2000 | Amro et al. |
| 6,044,372 A | 3/2000 | Rothfus et al. |
| 6,044,465 A | 3/2000 | Dutcher et al. |
| 6,055,236 A | 4/2000 | Nessett et al. |
| 6,055,570 A | 4/2000 | Nielsen |
| 6,058,250 A | 5/2000 | Harwood et al. |
| 6,058,417 A | 5/2000 | Hess et al. |
| 6,061,700 A | 5/2000 | Brobst et al. |
| 6,061,716 A | 5/2000 | Moncreiff |
| 6,064,985 A | 5/2000 | Anderson |
| 6,065,120 A | 5/2000 | Laursen et al. |
| 6,070,150 A | 5/2000 | Remington et al. |
| 6,073,173 A | 6/2000 | Bittinger et al. |
| 6,078,907 A | 6/2000 | Lamm |
| 6,078,924 A | 6/2000 | Ainsbury et al. |
| 6,078,929 A | 6/2000 | Rao |
| 6,081,830 A | 6/2000 | Schindler |
| 6,084,585 A | 7/2000 | Kraft et al. |
| 6,085,186 A | 7/2000 | Christianson et al. |
| 6,085,188 A | 7/2000 | Bachmann et al. |
| 6,085,229 A | 7/2000 | Newman et al. |
| 6,085,238 A | 7/2000 | Yuasa et al. |
| 6,088,700 A | 7/2000 | Larsen et al. |
| 6,088,711 A | 7/2000 | Fein et al. |
| 6,088,722 A | 7/2000 | Herz et al. |
| 6,101,500 A | 8/2000 | Lau |
| 6,108,686 A | 8/2000 | Williams, Jr. |
| 6,108,691 A | 8/2000 | Lee et al. |
| 6,112,212 A | 8/2000 | Heitler |
| 6,119,079 A | 9/2000 | Wang et al. |
| 6,119,098 A | 9/2000 | Guyot et al. |
| 6,119,101 A | 9/2000 | Peckover |
| 6,119,229 A | 9/2000 | Martinez et al. |
| 6,122,673 A | 9/2000 | Basak et al. |
| 6,125,186 A | 9/2000 | Saito et al. |
| 6,125,352 A | 9/2000 | Franklin et al. |
| 6,128,602 A | 10/2000 | Northington et al. |
| 6,128,603 A | 10/2000 | Dent et al. |
| 6,128,624 A | 10/2000 | Papierniak et al. |
| 6,128,655 A | 10/2000 | Fields et al. |
| 6,131,115 A | 10/2000 | Anderson et al. |
| 6,134,532 A | 10/2000 | Lazarus et al. |
| 6,134,534 A | 10/2000 | Walker et al. |
| 6,134,548 A | 10/2000 | Gottsman et al. |
| 6,134,658 A | 10/2000 | Multerer et al. |
| 6,138,155 A | 10/2000 | Davis et al. |
| 6,138,158 A | 10/2000 | Boyle |
| 6,141,333 A | 10/2000 | Chavez, Jr. |
| 6,141,651 A | 10/2000 | Riley et al. |
| 6,147,975 A | 11/2000 | Bowman-Amuah |
| 6,148,402 A | 11/2000 | Campbell |
| 6,157,924 A | 12/2000 | Austin |
| 6,167,448 A | 12/2000 | Hemphill et al. |
| 6,169,992 B1 | 1/2001 | Beall et al. |
| 6,172,677 B1 | 1/2001 | Stautner et al. |
| 6,175,864 B1 | 1/2001 | Addison et al. |
| 6,181,786 B1 | 1/2001 | Detampel et al. |
| 6,182,085 B1 | 1/2001 | Eichstaedt |
| 6,182,142 B1 | 1/2001 | Win |
| 6,182,229 B1 | 1/2001 | Nielsen |
| 6,185,601 B1 | 2/2001 | Wolff |
| 6,192,380 B1 | 2/2001 | Light et al. |
| 6,192,407 B1 | 2/2001 | Smith et al. |
| 6,195,651 B1 | 2/2001 | Handel et al. |
| 6,199,077 B1 | 3/2001 | Inala et al. |
| 6,199,079 B1 | 3/2001 | Gupta et al. |
| 6,199,082 B1 | 3/2001 | Ferrel et al. |
| 6,199,099 B1 | 3/2001 | Gershman et al. |
| 6,199,113 B1 | 3/2001 | Alegre et al. |
| 6,202,062 B1 | 3/2001 | Cameron et al. |
| 6,202,210 B1 | 3/2001 | Ludtke |
| 6,205,433 B1 | 3/2001 | Boesch |
| 6,205,456 B1 | 3/2001 | Nakao |
| 6,205,473 B1 | 3/2001 | Thomasson et al. |
| 6,208,975 B1 | 3/2001 | Bull |
| 6,212,548 B1 | 4/2001 | DeSimone et al. |
| 6,219,705 B1 | 4/2001 | Steinberger et al. |
| 6,223,292 B1 | 4/2001 | Dean et al. |
| 6,226,648 B1 | 5/2001 | Appleman et al. |
| 6,226,750 B1 | 5/2001 | Trieger |
| 6,233,592 B1 | 5/2001 | Schnelle et al. |
| 6,233,608 B1 | 5/2001 | Laursen et al. |
| 6,236,991 B1 | 5/2001 | Frauenhofer et al. |
| 6,236,994 B1 | 5/2001 | Swartz et al. |
| 6,237,096 B1 | 5/2001 | Bisbee et al. |
| 6,240,443 B1 | 5/2001 | Suzuki et al. |
| 6,243,755 B1 | 6/2001 | Takagi et al. |
| 6,252,544 B1 | 6/2001 | Hoffberg |
| 6,253,188 B1 | 6/2001 | Witek et al. |
| 6,253,208 B1 | 6/2001 | Wittgreffe et al. |
| 6,253,326 B1 | 6/2001 | Lincke et al. |
| 6,260,039 B1 | 7/2001 | Schneck et al. |
| 6,263,501 B1 | 7/2001 | Schein et al. |
| 6,266,615 B1 | 7/2001 | Jin |
| 6,266,774 B1 | 7/2001 | Sampath et al. |
| 6,271,840 B1 | 8/2001 | Finseth et al. |
| 6,278,993 B1 | 8/2001 | Kumar et al. |
| 6,279,037 B1 | 8/2001 | Tams et al. |
| 6,282,278 B1 | 8/2001 | Doganata et al. |
| 6,286,029 B1 | 9/2001 | Delph |
| 6,286,043 B1 | 9/2001 | Cuomo et al. |
| 6,289,346 B1 | 9/2001 | Milewski et al. |
| 6,289,389 B1 | 9/2001 | Kikinis |
| 6,292,787 B1 | 9/2001 | Scott et al. |
| 6,301,584 B1 | 10/2001 | Ranger |
| 6,301,621 B1 | 10/2001 | Haverstock et al. |
| 6,304,860 B1 | 10/2001 | Martin, Jr. et al. |
| 6,317,718 B1 | 11/2001 | Fano |
| 6,317,783 B1 | 11/2001 | Freishtat |
| 6,324,538 B1 | 11/2001 | Wesinger, Jr. et al. |
| 6,324,569 B1 | 11/2001 | Ogilvie et al. |
| 6,330,321 B2 | 12/2001 | Detampel, Jr. et al. |
| 6,330,561 B1 | 12/2001 | Cohen et al. |
| 6,330,592 B1 | 12/2001 | Makuch et al. |
| 6,334,132 B1 | 12/2001 | Weeks |
| 6,339,761 B1 | 1/2002 | Cottingham |
| 6,341,353 B1 | 1/2002 | Herman et al. |
| 6,345,300 B1 | 2/2002 | Bakshi et al. |
| 6,347,398 B1 | 2/2002 | Parthasarathy et al. |
| 6,349,257 B1 | 2/2002 | Liu et al. |
| 6,349,307 B1 | 2/2002 | Chen |
| 6,351,464 B1 | 2/2002 | Galvin et al. |
| 6,356,834 B2 | 3/2002 | Hancock et al. |
| 6,356,899 B1 | 3/2002 | Chakrabarti et al. |
| 6,356,905 B1 | 3/2002 | Gershman et al. |
| 6,360,205 B1 | 3/2002 | Iyengar |
| 6,360,332 B1 | 3/2002 | Weinberg et al. |
| 6,366,923 B1 | 4/2002 | Lenk et al. |
| 6,377,567 B1 | 4/2002 | Leonard |
| 6,377,993 B1 | 4/2002 | Brandt et al. |
| 6,380,890 B1 | 4/2002 | Smith et al. |
| 6,381,592 B1 | 4/2002 | Reuning |
| 6,385,595 B1 | 5/2002 | Kolling et al. |
| 6,385,655 B1 | 5/2002 | Smith et al. |
| 6,397,212 B1 | 5/2002 | Biffar |
| 6,405,245 B1 | 6/2002 | Burson et al. |
| 6,408,292 B1 | 6/2002 | Bakalash et al. |

| | | |
|---|---|---|
| 6,412,073 B1 | 6/2002 | Rangan |
| 6,421,693 B1 | 7/2002 | Nishiyama et al. |
| 6,424,979 B1 | 7/2002 | Livingston et al. |
| 6,430,542 B1 | 8/2002 | Moran |
| 6,438,580 B1 | 8/2002 | Mears et al. |
| 6,442,590 B1 | 8/2002 | Inala et al. |
| 6,442,607 B1 | 8/2002 | Korn et al. |
| 6,453,339 B1 | 9/2002 | Schultz et al. |
| 6,470,383 B1 | 10/2002 | Leshem et al. |
| 6,473,740 B2 | 10/2002 | Cockrill et al. |
| 6,484,155 B1 | 11/2002 | Kiss |
| 6,490,601 B1 | 12/2002 | Markus et al. |
| 6,499,036 B1 | 12/2002 | Gurevich |
| 6,499,042 B1 | 12/2002 | Markus |
| 6,516,303 B1 | 2/2003 | Wallman |
| 6,517,587 B2 | 2/2003 | Satyavolu et al. |
| 6,538,673 B1 | 3/2003 | Maslov |
| 6,544,295 B1 | 4/2003 | Bodnar |
| 6,546,393 B1 | 4/2003 | Khan |
| 6,553,359 B1 | 4/2003 | Schwenkreis |
| 6,560,639 B1 | 5/2003 | Dan et al. |
| 6,567,814 B1 | 5/2003 | Bankler et al. |
| 6,567,850 B1 | 5/2003 | Freishtat et al. |
| 6,572,662 B2 | 6/2003 | Manohar et al. |
| 6,594,766 B2 | 7/2003 | Rangan et al. |
| 6,601,066 B1 | 7/2003 | Davis-Hall et al. |
| 6,605,120 B1 | 8/2003 | Fields et al. |
| 6,606,606 B2 | 8/2003 | Starr |
| 6,609,128 B1 | 8/2003 | Underwood |
| 6,609,200 B2 | 8/2003 | Anderson |
| 6,625,581 B1 | 9/2003 | Perkowski |
| 6,631,402 B1 | 10/2003 | Devine et al. |
| 6,631,496 B1 | 10/2003 | Li et al. |
| 6,633,910 B1 | 10/2003 | Rajan et al. |
| 6,643,652 B2 | 11/2003 | Helgeson et al. |
| 6,694,546 B1 | 2/2004 | Kasem |
| 6,697,860 B1 | 2/2004 | Kung |
| 6,717,376 B2 | 4/2004 | Lys et al. |
| 6,718,365 B1 | 4/2004 | Dutta |
| 6,725,425 B1 | 4/2004 | Rajan et al. |
| 6,732,102 B1 | 5/2004 | Khandekar |
| 6,745,229 B1 | 6/2004 | Gobin et al. |
| 6,754,833 B1 | 6/2004 | Black et al. |
| 6,792,082 B1 | 9/2004 | Levine |
| 6,792,422 B1 | 9/2004 | Stride et al. |
| 6,801,929 B1 | 10/2004 | Donoho et al. |
| 6,802,042 B2 | 10/2004 | Rangan |
| 6,807,558 B1 | 10/2004 | Hassett et al. |
| 6,810,414 B1 | 10/2004 | Brittain |
| 6,826,553 B1 | 11/2004 | DaCosta et al. |
| 6,847,988 B2 | 1/2005 | Toyouchi et al. |
| 6,856,415 B1 | 2/2005 | Simchik et al. |
| 6,859,212 B2 | 2/2005 | Kumar et al. |
| 6,901,394 B2 | 5/2005 | Chauhan et al. |
| 6,915,336 B1 | 7/2005 | Hankejh et al. |
| 6,915,482 B2 | 7/2005 | Jellum et al. |
| 6,920,609 B1 | 7/2005 | Manber et al. |
| 6,944,660 B2 | 9/2005 | Eshghi et al. |
| 7,006,993 B1 | 2/2006 | Cheong et al. |
| 7,013,310 B2 | 3/2006 | Messing et al. |
| 7,085,994 B2 | 8/2006 | Gvily |
| 7,085,997 B1 * | 8/2006 | Wu et al. ................. 715/201 |
| 7,178,096 B2 | 2/2007 | Rangan et al. |
| 7,225,249 B1 | 5/2007 | Barry et al. |
| 7,249,315 B2 | 7/2007 | Moetteli |
| 7,313,813 B2 | 12/2007 | Rangan et al. |
| 2001/0000537 A1 | 4/2001 | Inala et al. |
| 2001/0011341 A1 | 8/2001 | Hayes Jr. et al. |
| 2001/0016034 A1 | 8/2001 | Singh et al. |
| 2001/0020237 A1 | 9/2001 | Yarnall et al. |
| 2001/0020242 A1 | 9/2001 | Gupta et al. |
| 2001/0023414 A1 | 9/2001 | Kumar et al. |
| 2001/0032182 A1 | 10/2001 | Kumar et al. |
| 2001/0037294 A1 | 11/2001 | Freishtat et al. |
| 2001/0051907 A1 | 12/2001 | Kumar et al. |
| 2002/0002536 A1 | 1/2002 | Braco |
| 2002/0007330 A1 | 1/2002 | Kumar et al. |
| 2002/0015480 A1 | 2/2002 | Daswani et al. |
| 2002/0019810 A1 | 2/2002 | Kumar et al. |
| 2002/0023104 A1 | 2/2002 | Satyavolu et al. |
| 2002/0023108 A1 | 2/2002 | Daswani et al. |
| 2002/0032782 A1 | 3/2002 | Rangan et al. |
| 2002/0059369 A1 | 5/2002 | Kern et al. |
| 2002/0078079 A1 | 6/2002 | Rangan et al. |
| 2002/0082990 A1 | 6/2002 | Jones |
| 2002/0095651 A1 | 7/2002 | Kumar et al. |
| 2002/0174006 A1 | 11/2002 | Rugge et al. |
| 2003/0120774 A1 | 6/2003 | Satyavolu et al. |
| 2003/0126134 A1 | 7/2003 | Messing et al. |
| 2003/0191661 A1 | 10/2003 | Doyle et al. |
| 2003/0204485 A1 | 10/2003 | Triggs |
| 2004/0031030 A1 | 2/2004 | Kidder et al. |
| 2004/0078282 A1 | 4/2004 | Robinson |
| 2004/0158524 A1 | 8/2004 | Anderson et al. |
| 2004/0162778 A1 | 8/2004 | Kramer et al. |
| 2004/0236696 A1 | 11/2004 | Aoki et al. |
| 2005/0034055 A1 | 2/2005 | Rangan et al. |
| 2005/0165651 A1 | 7/2005 | Mohan |
| 2005/0210297 A1 | 9/2005 | Wu et al. |
| 2006/0116949 A1 | 6/2006 | Wehunt et al. |
| 2006/0229985 A1 * | 10/2006 | Lalwani et al. ................. 705/41 |
| 2006/0253463 A1 | 11/2006 | Wu et al. |
| 2006/0253742 A1 | 11/2006 | Elenburg et al. |
| 2007/0250920 A1 * | 10/2007 | Lindsay ........................ 726/7 |

FOREIGN PATENT DOCUMENTS

| | | |
|---|---|---|
| EP | 0786728 | 7/1997 |
| EP | 0848338 | 6/1998 |
| JP | 7074817 | 3/1995 |
| WO | 97/16796 | 5/1997 |
| WO | 97/37314 | 10/1997 |
| WO | 98/28698 | 7/1998 |
| WO | 01/33759 | 5/2001 |

OTHER PUBLICATIONS

Omidyar, P., "Automatic Notification of Web Site Changes," Aug. 30, 1995.
Boeing Chooses NetMind Enterprise Minder to Help Thousands of Employees Track Web-Based Information, PR Newswire, (p. 6426), Nov. 19, 1998.
Sullivan, E., "Caravelle's InfoWatcher 1.1. Keeps an Eye on the Web," PC Week, (p. 33), Jul. 14, 1997.
Cognisoft Announces IntelliServ, A Revolutionary Intranet Information Management Application; A Powerful Solution That Enables the Right Information to Find the Right User at the Right Time, Business Wire, (p. 8140125), Aug. 14, 1996.
FirstFloor and AirMedia Announce Partnership; FirstFloor Smart Delivery to Utilize AirMedia Wireless Technologies, Business Wire, (p. 7291077), Jul. 29, 1997.
Fujitsu Announces Availability of ByeDesk Link for Alpha-Numeric pages; Next Step in Empowering Mobile Workforces with "Anyplace, Anytime" Information, Business Wire, (p. 7091066), Jul. 9, 1998.
Fujitsu Announces "WebAgent Application as Part of ByeDesk Link Wireless Server Software," Business Wire, (p. 09010210), Sep. 1, 1998.
Fujitsu Picks NetMind for Wireless Web Agent Software, Computergram International, Sep. 2, 1998.
Fujitsu's ByeDesk Link Now Available on the PalmPilot, Business Wire, (p. 1455), Sep. 21, 1998.
GC Tech's GlobeID Payment Internet Commerce Software Supports Microsoft Merchant Server, Business Wire, (p. 1211286), Jan. 21, 1997.
Kravitz, D.W., "Highly Scalable on-Line Payments Via Task Decoupling," Financial Cryptography First International Conference, (p. 355-73), 1997.
Rapoza, J., "Minding Web Site Changes," PC Week, V. 15, No. 37 (p. 32), Sep. 14, 1998.
NetMind Accepts $7 Million StrategiC Investment From Three Prominent VC Firms—BancBoston, Softbank and Draper Fisher Jurvetson, PR Newswire, (p. 7632), Nov. 6, 1998.
NetMind Celebrates Five Million Active Users, PR Newswire, (p. 6488), Dec. 18, 1998.

NetMind Updates the World's Largest Free Web Tracking Service, PR Newswire, (p. 5077), Sep. 18, 1998.
Douglis, F. et al., "The At&T Internet Difference Engine: Tracking and Viewing Changes on the Web," World Wide Web, 1(1), (pp. 27-44), Jan. 1998.
Ajzenszmidt, I.M., "Versatile Intelligent Agents in Commercial Applications," Dec. 13, 1998.
Zhao, Y., "WebEntree: A Web Service Aggregator," IBM Systems Journal, vol. 37, No. 4, 1998.
Ashish, N. et al., "Optimizing Information Agents by Selectively Materializing Data," American Association for Artificial Intelligence (1998).
Knoblock, C. et al., "Modeling Web Sources for Information Integration," American Association for Artificial Intelligence (1997).
Knoblock, C. et al., "The Ariadne approach to Web-based information integration," University of Southern California, Sep./Oct. 1998.
"Online Financial Services Participant Guide", Telephone Services University, 1996.
Quick Reference Handout for Wells Fargo On-Line, Jan. 23, 1996, (18 Pages).
Orbix Programmer's Guide, IONA Technologies, Apr. 1995, (10 Pages).
Trader Implementation with Orbix & ALLBASE (TC talk, Jun. 1994).
Business Wire Article: Wells Fargo Bank is first to offer customers Internet access to bank account balances, May 18, 1995.
"Using CORBA to Integrate Legacy Systems," Presented by Erik S. Townsend, Object World Boston, Mar. 22, 1995.
The Business Case for Distributed Computing, Presented by Michael L. Ronayne, Object World Boston, May 1996.
"Lessons Learned Deploying Large-Scale Distributed Object Computing Systems," Presented by Michael L. Ronayne, Object World Boston, May 1996.
Birrell, A. et al., "Implementing Remote Procedure Calls," ACM Transactions on Computer Systems, vol. 2, No. 1, (pp. 39-59), Feb. 1984.
Ronayne, M. et al., "Distributed Object Technology at Wells Fargo Bank," The Cushing Group, Inc. (1996).
American Banker Article, "Wells Fargo: Innovations in Customer Management," Nov. 3, 1997.
Edwards, N. et al., "Distributed Objects and the World Wide Web," Abstract; Aug. 24, 1994.
"A Note on Distributed Computing," Sun Microsystems Laboratories, Inc., Nov. 1994.
DeNitto, K., "DCE Means Business," Mar. 20, 1995.
Smith, M., Interview with Bruce MacNaughton Article, Nov. 1996.
Truncale, D., CompuServe Brings NT Online Article, Nov. 1996.
CompuServe Keynote Address Given at Internet@Telecom95, Geneva, Switzerland, Oct. 8, 1995.
Wells Fargo: A Case Study, The Cushing Group, Inc. (1994-1997).
NetBill: An Internet Commerce System Optimized for Network-Delivered Services; Marvin Sirbu and J.D. Tygar, IEEE Personal Communications, 2:4, Aug. 1995, pp. 34-39.
"Collapsible User Interfaces for Information Retrieval Agents," Martin Frank and Pedro Szekely, Proceedings of the International Conference on Intelligent User Interfaces, Jan. 5-8, 1999, Redondo, CA, pp. 15-22.
"ASoftbot-based Interface to the Internet," Oren Etzioni and Daniel Weld, Communicaiton in the ACM, vol. 37, No. 7, Jul. 1994, pp. 72-76.
"Strategic Directions in Database Systems—Breaking Out of the Box," Avi Silberschatz and Stan Zdonik et al., ACM Computing Surveys, vol. 28, No. 4, pp. 764-778, Dec. 1996.
"Database Security and Privacy," Sushil Jajodia, ACM Computing Surveys, vol. 28, Issue 1, pp. 129-131, Mar. 1996.
"Managing Security and Privacy of information," Sushil Jajodia, ACM Computing Surveys, vol. 28, Issue 4, Dec. 1996.
Masao Ito, "producet Review WWW Autopilot Software Naminoriyaro Enterprise", Nikkei Windows NT, No. 19, Nikkei BP, Oct. 1, 1998, pp. 26-28 (JPO CSDB Literature No. National Technical Journal 1998-01804-002.

Masaya Suzuki, "Naminoriyaro Enterprise Ver. 1.0", ASCII NT, vol. 3, No. 10 ASCII Corporation, Oct. 1, 1998, pp. 118-119 (JPO CSDB Literature No. National Technical Journal 1998-01100-010).
Naminoriyaro Plays an Active Role in Small Offices, INTER-NET magazine, No. 44, Impress Corporation, Sep. 1, 1998, p. 237 (JPO CSDB Literature No. National Technical Journal 2000-00181-017).
"Autopilot Software Requires No Waiting Time", ASCII DOS/V Issue vol. 4, No. 10, ASCII Corporation, Oct. 1, 1998, pp. 190-191 (JPO CSCB Literature No. National Technical Journal 1998-01798-011).
"Introduction to Outdoor Network" DOS/V magazine, vol. 6, No. 10, Soft Bank Corporation, May 15, 1997, 993 144-155 (JPO CSDB Literature No. National Technical Journal 1998-01206-003.
Tadatoshi Hirono, "Have a Lead on Active Web Pages! No. 9", Internet ASCII, vol. 3, No. 4 ASCII Corporation, Apr. 1, 1998, pp. 390-391 (JPO CSDB Literature No. National Technical Journal 2000-00394-027).
Kazuya Ishikawa, "What is a "cookie" which you see on WWW browsers?", INTERNET magazine, No. 39, Impress Corporation, Apr. 1, 1998, 99. 216-217 (JPO CSDB Literature No. National Technical Journal 2000-00176-008).
Jun Nakajima, "Internet Techniques for Beginners No. 9", Interface, vol. 24, No. 9, CQ Publishing Co., Ltd., Sep. 1, 1998, 99. 72-76 (JPO CSDB Literature No. National Technical Journal 1998-01164-001).
Chaum, D. Security without identification: transaction systems to make big brother obsolete. Communication of the ACM. Oct. 1985. vol. 28. Issue 10 pp. 1030-1044.
Chakrabarti et al. Mining the Web's link structure Computer Aug. 1999. pp. 60-67.
Das et al., Experiments in using agent-based retrieval from distributed heterogeneous database, Knowledge and Data Engineering Exchange Works Nov. 1997 abstract'.
Frecon WEBPATH—a three dimensional Web history, Information Visualization IEEE Symposium on Oct. 1998, pp. 3-10.
Park, Intelligent query and browsing information retrieval (QBIR) agent, Acoustics, Speech and Signal Processing, IEEE International Conference May 1998 pp. 1173-1176.
Stanley, Tracey, "Intelligent Searching Agents on the Web", Jan. 1997, 4 pages, <http://www.ariadne.ac.uk/issue7/search -engines/>.
Jansen, James, "Using an Intelligent Agent to Enhance Search Engine Performance", Dec. 1998, 13 pages, <http: /www.firstmonday.dk/issues issue2 3/iansen/>.
Lesser, Victor et al., "Big: A Resource_Bounded Information Gathering Agent", Jan. 1998, 18 pages <http://dis.cs.umass.edu/research/big/>.
Severance C. Could LDAP be the next killer DAP? IEEE Computer vol. 30 Issue 8 Aug. 1997, pp. 88-89.
Gardner Stephen R. Building the data warehouse Communications of the ACM vol. 41 Issue 9 Sep. 1998, pp. 52-60.
Bontempo, Charles et al., The IBM data warehouse, Communications of the ACM, vol. 41, Issue 9, Sep. 1998, pp. 38-48.
Fryer et al. (Eds.), Microsoft Computer Dictionary, 1997 3rd Edition, pp. 238-240, 487.
Mollohan, Gary, Wireless Revolution, Appliance. Aug. 1999. vol. 56. No. 8 p. 49.
Anonymous. Dialog file 20 (World Reporter). No. 3629961. 3Com Announces the Pal, VII Connected Organizer, the First Handheld Solution for Out-Of-The-Box Wireless Internet Access. Business Wire. Dec. 2, 1998. 4 pages, especially p. 1, lines 18-33, p. 2, lines 1-10 p. 3, lines 21-30 and p. 4 lines 2-17 and lines 21-24.
Pelline, *LookSmart to be ISP home page*, Web page, unverified print date of Sep. 22, 2000, unverified cover date of Aug. 14, 1997.
Macavinta, *Excite, Lycos get more personal*, Web page, unverified print date of Sep. 22, 2000, unverified cover date of Apr. 13, 1998.
Shiro Iba, "What is it? Explorer File No. 7 'How much is the ease of use of Internet banking?'", SOHO Computing, vol. 3, No. 9, Cybiz Co., Ltd, Jun. 1, 1998, 99 55-60 (JPO CSDB Literature No. National Technical Journal 1998-00782-002).
Unknown, Roboword, Multilingual Dictionary Tool, Jul. 27, 1997, pp. 1-3, all.
Maret et al., Multimedia Information Intechange: Web Forms Meet Date Servers, Jun. 11, 1999, IEEE International Conference, vol. 2, 499-505.

Armstrong, Robert et al., WebWatcher: A Learning Apprentice for the World Wide Web, School of Computer Science, Carnegie Mellon Univerity, Feb. 1995, pp. 1-7.

Hilbert et al., "Agents for Collecting Application Usage Data Over the Internet," ACM, 1998, pp. 149-156.

Lin et al., "Taking the Byte Out of Cookies," Computer and Society, Jun. 1998, pp. 39-51.

F. Kilander, "A Brief Comparison of News Filtering Software", Department of Computer and Systems Sciences, 1995, pp. 1-13.

K. Sycara et al., "Distributed Intelligent Agents", The Robotics Institue, Carnegie Mellon University, 1996, pp. 1-32.

W3C's, "HTML 4.0 Specification," Apr. 24, 1998, http://www.w3.org/TR/1998/REC-html40-19980424/, pp. 1-27.

* cited by examiner

My Pin Vault

| URL | User Name | PIN/Password | Token File |
|---|---|---|---|
| ******** | **** *** | ******* | ↗ |
| ******** | **** *** | **** | ↙ |
| ******** | **** *** | ******** | ↙ |
| ******** | **** *** | **** ****** | ↘ |
| ******** | **** *** | ******** | → |
| | | | |
| | | | |
| | | | |

*Fig.2*

SYSTEM FOR PERFORMING WEB AUTHENTICATION OF A USER BY PROXY

CROSS-REFERENCE TO RELATED APPLICATIONS

NA

BACKGROUND OF THE INVENTION

1. Field of the Invention

The present invention is in the field of Internet navigation including various communication means and connection technologies and pertains to systems and methods enabling Web authentication of users by proxy for gathering summary data and authorizing Web transactions.

2. Discussion of the State of the Art

In the field of Internet communications, particularly Web browsing activities, it is known that proxy servers exist and that a proxy service may perform tasks on behalf of a subscribing user, and may present the information to that user at some point in time that is convenient for the user. The inventor is aware of a service that aggregates data from one or more Web sites submitted by the user for the purpose, and can summarize the data for the user before presenting it or otherwise making the summary presentation available to the user. The service is accessible through a portal server functioning as a proxy or go-between. The server has software installed and configured to do summary searches based on Internet destinations and instructions provided by the subscribers. Information is retrieved from such destinations based on pre-programmed site information. The summary data can be accessed at the server or downloaded to the user's personal device for consumption.

The software that enables the service includes a configuration and initiation interface for a subscriber to set up and start a summary search. In some cases retrieved information is immediately sent to the subscriber's personal device, and in other situations such information is saved at the portal server to be retrieved by a subscriber at a later time, or in some cases pushed to the subscriber at specified times. In preferred embodiments of the invention automatic logins are accomplished for a subscriber at Internet destinations by use of pre-stored configuration information and user authentication credentials.

The subscribing user pre-provides the login data to the service in association with any site that requires the information. The service, using the appropriate site login data represents the user to the user's subscribed-to Web sites and services. Using this service saves the user from having to remember and repeatedly type in authentication data to get information from their Web locations.

More recently, security regimens have been developed to elevate the level of security provided over the traditional username/personal identification number or password combination login credentials. One improvement is the advent of hardware or software Web token generators that are often used in conjunction with traditional authentication elements to authenticate a user. For example, a Web-based account or service may require the user to log in and provide, in addition to normal user credentials, a token that changes in value, say every 60 seconds. One popular method is to provide a hardware token generator that provides a unique token value at predictable intervals such as every 60 seconds. The hardware may be provided in the form of a universal serial bus (USB) device, for example. Soft token generators are also available for handheld devices like personal digital assistants and cell phones. The server accepting the token has prior information as to which token number value should be current for a particular user, based on the time intervals, and can perform a database lookup to compare a received token with the expected token and then determine whether to grant access based on the results of the lookup.

Another relatively new development is CAPTCHA, which is an acronym for Completely Automated Public Turing Test to tell Computers and Humans Apart. CAPTCHA is a challenge/response test used in network computing to determine whether a requester of services is in fact human or a machine attempting to emulate a human. A server may be configured to initiate the CAPTCHA whenever a request for services is received. The test involves having the requestor look at a distorted character display and then type the correct sequence of characters into a provided input field associated with the display. The data received back at the server authenticates the requester as Human if the information is correct. Otherwise the requester is a machine that might be a malicious operator on the network.

Both of the developments described above present a challenge for automated data aggregation and summary services. Because the Web-site access, authentication (if required) and data gathering is performed by software operating on a machine, it cannot complete automated proxy logins if CAPTCHA is required to gain access or to perform a transaction. In the case of time-sensitive tokens, the software described further above has no way of inputting or utilizing the unique user token data without the user's direct input.

In examples and descriptions that follow, two-factor authentication generally comprises the following: There are typically three universally recognized factors for authenticating individuals: (1) Something a person knows, such as a password, a PIN or an out-of-wallet-response. (2) Something a person has, such as a mobile phone, a credit card or a hardware security token. (3) Something a person is, such as represented by a fingerprint, by a retinal scan, or by some other biometric.

A system is said to leverage Two-factor authentication (T-FA, or dual factor authentication) when it requires at least two of the authentication form factors mentioned above. This contrasts with traditional password authentication, which requires only one authentication factor (such as knowledge of a password) in order to gain access to a system.

SUMMARY OF THE INVENTION

The inventors in the present case recognized significant problems in requiring users to provide authentication information to on-line data-gathering services, which information would be stored at the data gathering service site, and therefore be vulnerable to misuse. As a result the inventors have provided, in one embodiment, a data gathering system having an Internet-capable appliance associated with a user, a Pin Vault software instance executing from a digital memory media coupled to the appliance, and a Pin Vault file stored in a data repository coupled to the appliance, the Pin Vault file comprising data for authenticating the user to one or more web sites storing information of interest to the user. The Pin Vault software cooperates with an Internet service to provide, from the Pin Vault, data as needed by the Internet service to log onto and authenticate as the user at the one or more web sites storing information of interest to the user, to gather information on behalf of the user.

In another aspect the inventors have provided a data gathering system having an Internet site executing, from a digital memory media coupled to the site, data-gathering software browsing to Internet sites storing information of interest to the user, logging in and authenticating as the user, and gathering information from the sites for the user, and Pin Vault software executing on the site from the digital memory media, cooperating across the Internet network with an instance of Pin Vault software executing on an Internet-capable appliance associated with the user, accessing from a Pin Vault software instance executing from a digital memory media coupled to the appliance, authentication data from a Pin Vault file stored on the appliance. The Internet site follows configuration by the user to gather data on behalf of the user.

In another aspect the inventors have provided a data gathering method of executing a Pin Vault software instance from a digital memory media coupled to an Internet-capable appliance, to cooperate with an Internet service to provide, from a Pin Vault stored in a data repository coupled to the appliance, data as needed by the Internet service to log onto and authenticate as the user at one or more web sites storing information of interest to the user, to gather information on behalf of the user.

In yet another aspect the inventors have provided a data-gathering method of executing, from a digital memory media coupled to an Internet service site, data-gathering software browsing to other Internet sites storing information of interest to a particular user, logging in and authenticating as the user using authentication data retrieved from a Pin Vault file stored on an Internet-capable appliance associated with the user, and gathering information from the sites for the user.

BRIEF DESCRIPTION OF THE DRAWING FIGURES

FIG. 2 is a table representing client-side Web service and authentication credentials according to an embodiment of the present invention.

DETAILED DESCRIPTION

Figure 1:
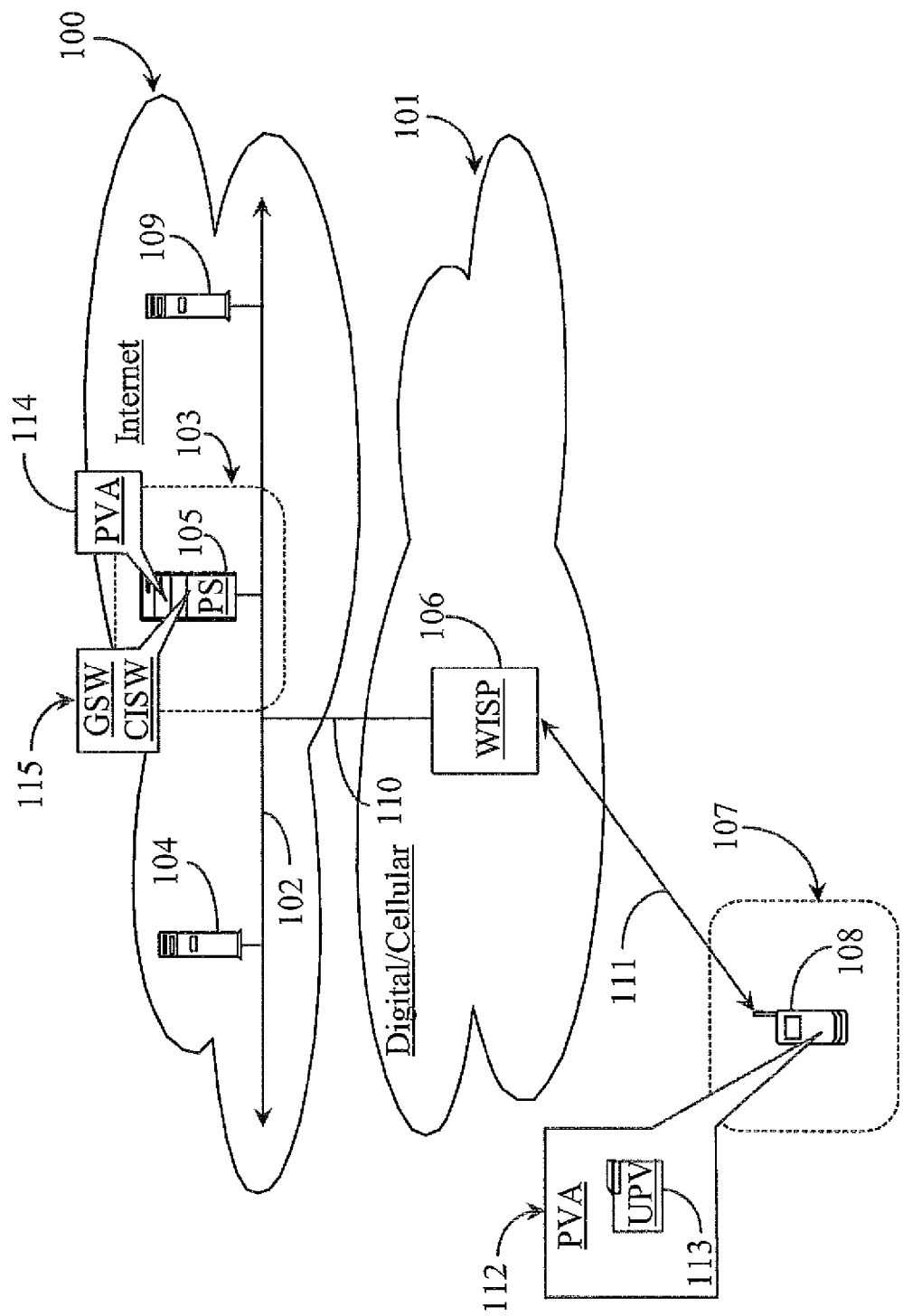
FIG. 1 is an architectural overview of a system that can perform two-factor authentication on behalf of a user.

Referring now to FIG. 1, an overview of a communications network is illustrated and includes the Internet network 100 and a cellular wireless telephone network 101. Internet network 100 is further defined by an Internet backbone 102 that represents, in this example, all of the lines, equipment, and connection points that make up the Internet as a whole. Therefore, there are no geographic limitations to the practice of the present invention.

Internet 100 includes illustrated Web servers 104 and 109, both coupled to backbone 102 for communication. Servers 104 and 109 serve electronic information pages (Web pages) ordered by users browsing the Internet by the user asserting a universal resource locator (URL). Servers 104 and 109 may be commercial Web sites through which online services are offered.

A service provider 103 is illustrated in this example, and represents a service that provides Web information search and summary services for subscribers as well as providing certain transaction services for those subscribers as described in the background section. Service provider 103 maintains a portal server (PS) 105 that is adapted as a Web portal through which data aggregation, normalization and summary services are accessible to subscribing users. PS 105 is coupled to Internet backbone 102 for communication.

A user domain 107 is illustrated in this example representing the domain of a user that subscribes to services offered by service provider 103 available through PS 105. In this example, a personal device 108 is used by the subscriber/user to access PS 105 for services, in this case wirelessly through network 101 via a wireless link 111. Network 101 includes a wireless Internet service provider (WISP) 106 that provides Internet connectivity to device 108, which is a cellular telephone, in this example, capable of browsing the Internet. WISP has connection to Internet backbone 102 via an Internet access line 110.

In this embodiment device 108 is a personal handheld device that accesses PS 105 wirelessly. However, this should not be construed as a limitation to practice of the present invention. Device 108 may also be a PDA, a laptop computer, or a desktop computer adapted for wireless Internet access. Likewise, network 101 may be a public switched telephone network (PSTN) instead of a wireless network and device 108 may be an Internet Protocol (IP) telephone or a personal computer (PC) capable of accessing PS 105 using any available Internet access method like digital subscriber line (DSL), broadband, or modem dialup services. The inventor illustrates a cellular telephone and wireless connectivity as an example for discussion purposes only, and to demonstrate versatility of device type and access methods.

As described above, a user operating device 108 may access PS 105 and access data aggregation and Web summary services to be performed on the user's behalf by proxy, and the user may not necessarily be connected during the time services are performed for the user. According to input from the user, PS 105 may navigate to various user-subscribed Web sites, such as those that may be maintained in servers 104 and/or 109. PS 105 may log in representing the user and access specific data from those sites and even perform certain transactions at those sites, authorized by the user.

The inventor provides an enhancement in this embodiment by providing a software application to run both client side and server side, the application termed a Pin Vault Application (PVA). An instance of server-side PVA 114 is provided to PS 105 and an instance of client-side PVA 112 is provided to personal device 108. In one embodiment, the client-side PVA application 112 contains an encrypted user pin vault (UPV) file 113 that is adapted to store at minimum all of the user's subscribed-to Web site locations and appropriate authentication credentials for accessing those sites. UPV file 113 may be a small file downloadable to a cell phone, PDA, or other device that may be memory-challenged, but not necessarily so. Likewise, the UPV file may be stored locally on any PC or laptop computer. The authentication credentials and other data in the encrypted UPV file may also have two levels of encryption. Encrypted file 113 is made accessible to PVA 114 running on PS 105.

In this embodiment PS 105 does not retain any user authentication information locally. In this embodiment, when PS 105 is performing data aggregation and summary services for the user, it accesses UPV 113 from the user's device when needed to obtain the required data in order to access the appropriate Web sites and services. PVA 114 has the appropriate encryption/decryption software (SW) to decrypt and use the user authentication credentials from UPV 113. The entire process is automated at server side and no human operator has access to the decrypted data of the user.

PS 105, in addition to PVA 114, has a gatherer software (GSW) agent application 115 installed and executable thereon that may spawn multiple individual instances for performing the offered services including performing site login authentication and data aggregation. In one embodiment, a single gatherer instance is responsible for gathering information from one site. Therefore, a user that has several sites may have several gatherer instances working to perform server side data aggregation and summary services simultaneously.

GSW 115 also includes a configuration and initiation software (CISW) interface that is accessible to device 108 and may be used to configure and to initiate or activate services. In applications known to the inventor without PVA 114 or 112, the user submits the required Web site access and authentication data to PS 105 for storage. In this case, PS 105 can only log into sites that do not require a two-factor authentication using time sensitive tokens or CAPTCHA displays. Provision of PVA 112 on device 108 enables the user to keep the sensitive information stored locally in encrypted format. In this embodiment, the user participates passively in the process of server-side data aggregation and summary by making the device accessible to PS 105 during the course of service performance.

In this embodiment PS 105 aided by PVA 114 may access device 108 as needed and interrogate UPV 113 to obtain required site location information and authentication data needed to access the sites. In an embodiment where one or more sites use time sensitive tokens as part of the two-factor authentication, PS 105 may obtain the correct token file from device 108 at the same time the standard authentication credentials are obtained at the time of login to the site. In this embodiment, the user need not provide any direct input so long as the correct token file is automatically generated and made available, in this case, within UPV 113.

In the case that any of the user's sites require submission of CAPTCHA data, those CAPTCHA displays, including the appropriate data entry boxes, may be captured from those sites and then submitted to device 108 at which time the user operating the device may type in the appropriate characters required by the site as part of the two-factor authentication. The CAPTCHA data is submitted at the time of login attempt after the user has received the CAPTCHA display from PS 105. PS 105 may retrieve the user login credentials and accept the user-submitted CAPTCHA data in the same transaction.

The first embodiment described above, using tokens only, requires that the device containing UVP 113 be powered on and connected to PS server 105. No direct participation is required of the user. In the case of a device using a USB token generator or some other hardware generator, the hardware should be connected to the device with the device connected online to PS 105. The hardware device should be one that automatically generates tokens without direct human input activity. If required, a human may be present to provide the token input for hardware that requires a user to depress a button or perform some other action to render the token at the time of login.

In both of the embodiments described above, the PVA software (114, 112) enables the user to store their own credentials locally and still benefit from server side performance power. In one embodiment, a user may also elect to transmit some or all of their UPV data to PS 105 for permanent or temporary storage.

A client may elect to schedule automatic refreshes of their summary data using PVA 112 and the client may also elect to manually refresh their summary data using PVA 112. A user interface (not illustrated) provides this functionality. Likewise, PS 105 aided by PVA instance 114 may detect when the user of device 108 is online and may initiate a connection to device 108 to request that it refresh the client's summary data. More detail about a PVA user interface is provided below.

In this embodiment, PVA software also enables the client to move credentials from a device such as device 108 to the portal server (PS 105) or from the server to the device. Moreover, the client may destroy the credential on the device or at the server remotely. The service provider may also destroy the credentials locally at the server or remotely at the client device depending on circumstances.

Figure 2:
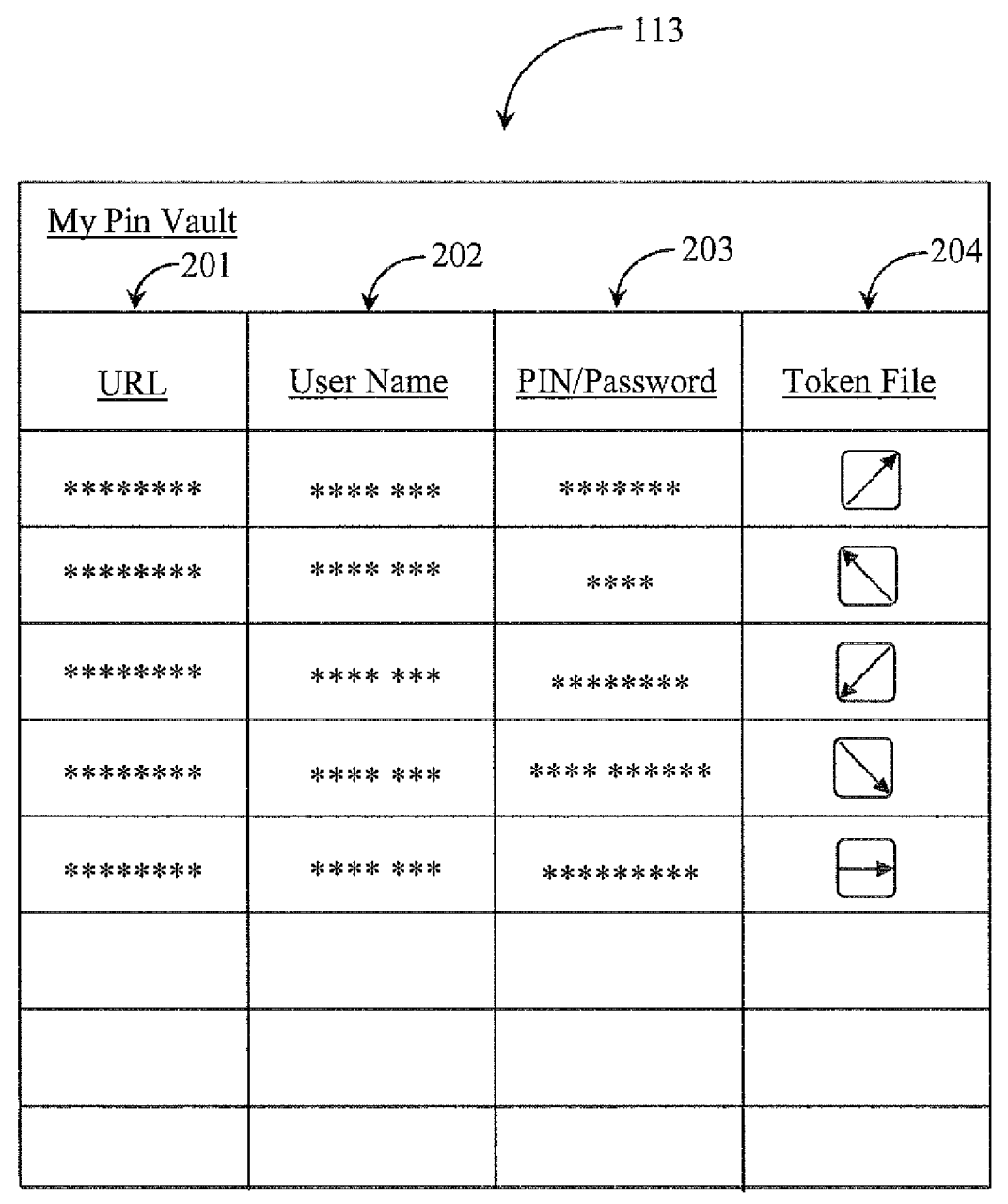

Referring now to FIG. 2, UPV 113 is logically illustrated in table form. In this example, UVP 113 bears a title "My Pin Vault" however other titles, logos, trademarks, and other information may also appear in a title bar or block. Table 113 may or may not be displayable and may vary widely in displayed format if it is displayable.

In this example, the table is divided into several columns and rows adapted to organize the client information and credentials. A column 201 headed URL lists the Web site navigation addresses to client sites. In this case, even the site URLs are encrypted and listed in no particular order in the adjoining rows of the table in column 201. A column 202 headed User Name lists the appropriate user names that the client has set up for the appropriate Web site addresses listed in column 201. All of the client's user names are encrypted in this example. A column 203 titled PIN/Password lists the appropriate PIN numbers and/or passwords that the client has associated with the appropriate usernames in column 202 for the appropriate addresses listed in column 201. The PIN and/or passwords are also encrypted.

It is important to note herein that the credentials may only be decrypted when being used by automated software to authenticate access or to authorize a transaction on behalf of a user preventing any human other than the client from accessing the information.

In this embodiment, table 113 has an additional column 204 titled Token File. Column 204 lists the current generated token files required in a two-factor authentication embodiment that correspond to the appropriate credentials in columns 203 and 202 for the appropriate site addresses listed in column 201. In column 204, there may or may not be any tokens listed as some site addresses may require token authentication as part of a two-factor authentication and some may not. In this example, there is a token for each listed site assuming that all of the sites listed in this embodiment require a token as part of a two-factor authentication.

Each token file is different from any other token file listed and the revolving placement of token files into each cell under column 204 depends on the specified time to live for each token instance. For example, in the first row under token file, a next token would be accessible after the current token expires, perhaps every 60 seconds or some other arbitrary period. In this example, PS 105 of FIG. 1 aided by SW PVA 114 may access UPV 113 at the client's device and may obtain any row of credentials, including the current token, when PVA 114 is performing a login to authenticate access to a site or to authenticate a transaction at a site. It is important to note herein that if a token expires just before a login attempt, the software may automatically retry the authentication using the next token generated.

Figure 3:
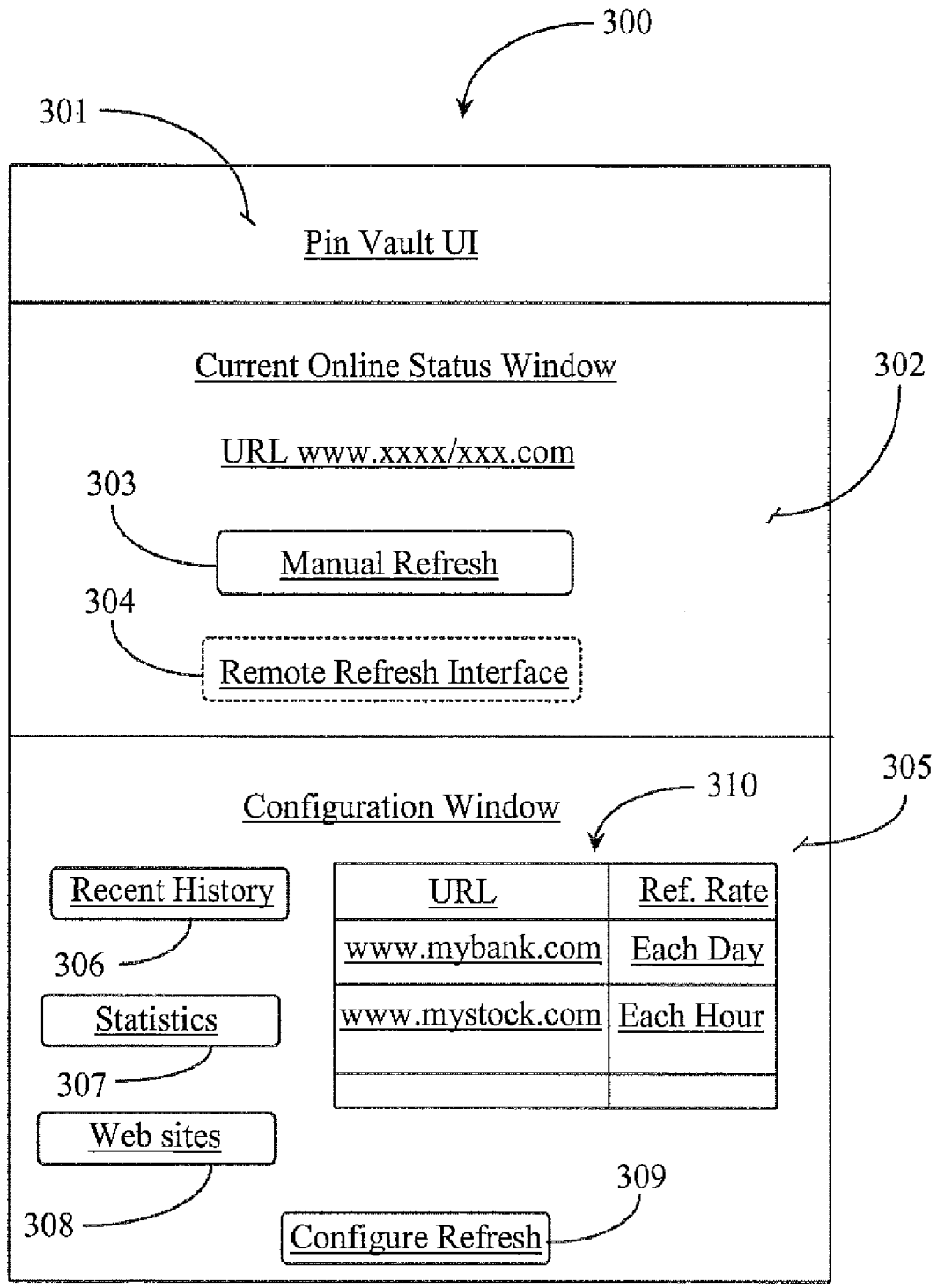
FIG. 3 is an exemplary screen shot of a client side configuration interface according to an embodiment of the present invention.

Referring now to FIG. 3, a pin vault user interface (UI) 300 is illustrated. UI 300 resides either on PS 105 of FIG. 1 or on the client device such as device 108, and may be an integrated part of PVA. UI 300 may include a title bar 301 identifying the interface. The title bar may include any pertinent information identifying the interface and version, trademark information, logo, personal client name, etc.

UI 300 includes an online status window 302 that shows the user if there is any current proxy activity taking place at the time. In this instance, the service is logged into a URL on behalf of the client. A client may activate interface 302 and watch the activity performed by the service at any time. Other status indicators might be present without departing from the spirit and scope of the present invention like a time window indication the time the service took to perform certain processes for the user at specific sites and for an overall aggregation and summarization sequence involving more than one site. In some cases the status window may show more than one URL at a time indicating that more than one instance of gatherer is working simultaneously for the user.

Status window 302 has an option initiated by button 303 for performing manual refresh of data. A user may select this option to initiate another round of refresh at any time. Status window 302 also includes a remote refresh interface that can be initiated remotely by the service from PS 105 of FIG. 1. The user may retain the right not to allow remote refresh capability if so desired. If allowed, the service may set a refresh schedule for the user. The user also has an option for scheduling refreshes of data for each individual site or for all of the sites submitted for server-side summarization services. This option is provided in window 305 adapted for configuration, and described below.

UI 300 includes a configuration window 305 adapted to enable a user to set and initiate preferences including scheduled refreshes. Configuration window 305 includes an interactive status indicator button 306 that when activated shows at least some portion of recent activity history. Another status indicator button 307 is provided that when activated shows some statistics such as error rates, percentages of successful login and aggregation sequences, and other like data. An interactive button 308 labeled Web sites enables a user to see the registered sites and to add new sites or delete existing sites from the service.

UI 300 includes an interactive button 309 adapted to enable the user to configure an automatic refresh interval for one or more sites registered to the service. Activation of option 309 may bring up a new window 310 listing site URLs and providing a column for entering a refresh rate for each listed site. In this example, a URL www.mybank.com is listed where the user has indicated a refresh rate of each day. A next URL, www.mystock.com has a refresh rate ordered for every hour. There are many different possibilities.

Figure 4:
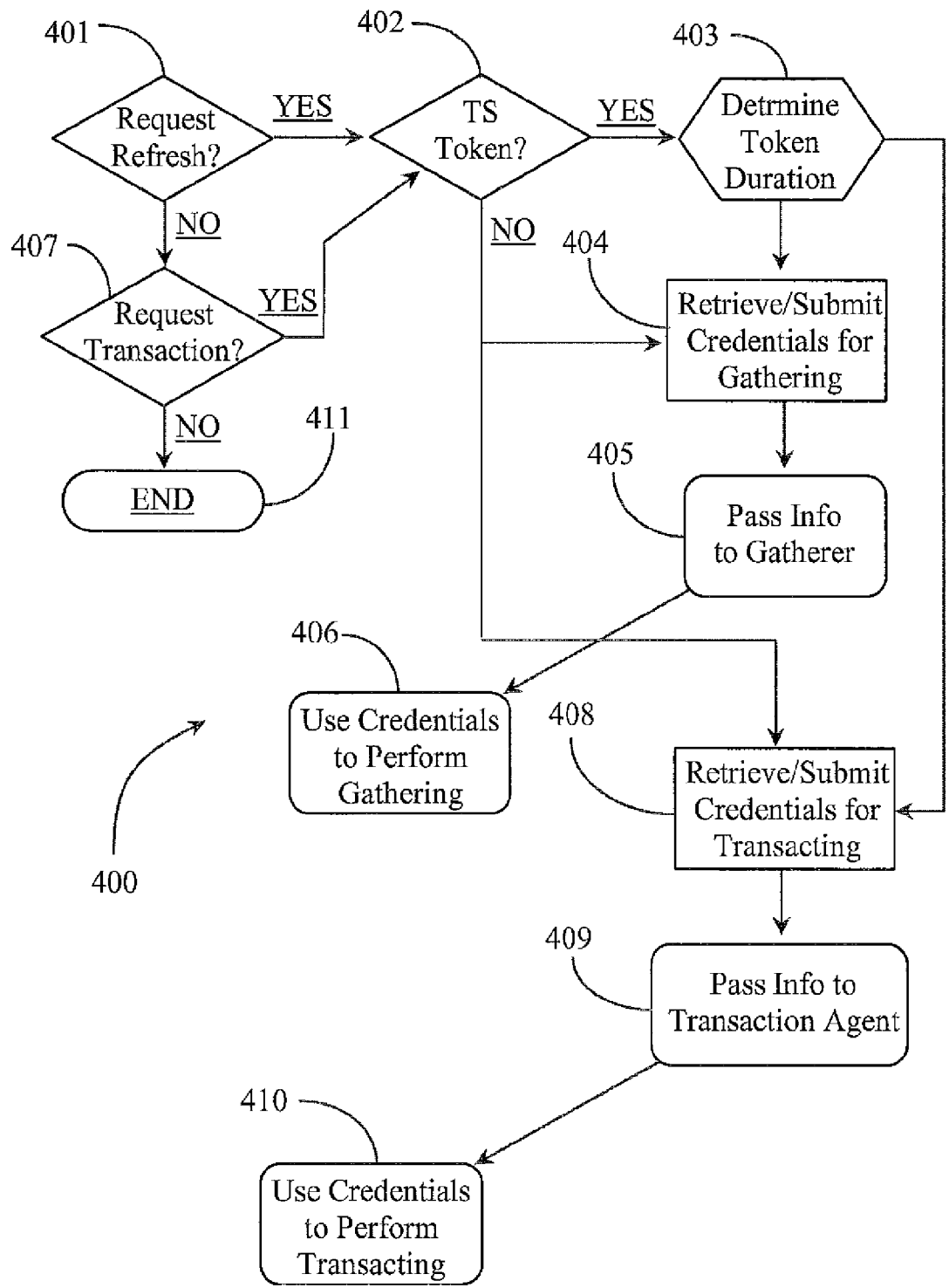
FIG. 4 is a process flow chart illustrating a two-factor authentication sequence by proxy leveraging a hardware or software token generator.

Referring now to FIG. 4, a process is illustrated for practicing the invention using a two-factor authentication sequence that requires use of a token as part of the authentication sequence.

In step 401, the user makes a determination if a manual refresh is appropriate. If in step 401 the user determines to manually refresh data for a site, for example, then in step 402, the system makes a determination if the login is a two-factor login that requires a token. If in act 402, the system determines that no token is required, then the authentication may not be a two-Factor authentication, in which case the process moves directly to step 404 where the system obtains the UVP credentials for login to perform data gathering. Alternatively, if there is no token required in step 402 and the nature of the activity for the site is to perform a transaction instead of gathering and summarizing data, then the process moves to step 408 from step 402 where the system receives the credentials for authenticating one or more ordered transactions. The sequence described above can be one that begins at step 407 if the user decides to request a transaction instead of step 401.

If in act 402, the system determines that a token is required as part of a two-factor authentication then at step 403, the system determines the time to live for the current token. If an order is login in to the site to perform data gathering, as ordered in step 401, then in step 404 the system obtains the credentials including the current token to use in the two-factor authentication for login. In any case scenario, in step 405 the system passes the required credentials in encrypted form to the gatherer software agent and in step 406 the gatherer agent uses the credentials and the token to perform authentication and login on behalf of the user.

If the user determines not to refresh in step 401, then in step 407, the user determines whether to request a transaction. If in step 407 the user decides to request a transaction, and in step 402 the system has verified a token is required and has determined the token life in step 403, then at step 408 the system obtains the required credentials and the token from the UPV client and in step 409 the data is passed in encrypted form to a transaction agent. In step 410, the transaction agent uses the credentials including the token to perform a transaction on behalf of the user. In this case, more than one transaction may be performed if allowed by the site using the same credentials and token. If the token expires during the course of transacting, the system may obtain the next token from the client UVP.

In either of the above sequences whether logging in to a site or authenticating a pending transaction, if the token part of the credentials fails then the system may automatically reattempt the sequence after obtaining a current token from the user. Also, either sequence may be initiated from steps 401 or 407 independently without departing from the spirit and scope of the present invention. If in step 401 there is no refresh request and in step 407 there is no transaction request then the process may terminate in step 411 or cycle without doing anything.

The only difference in the process sequences for a two-factor authentication whether for initial login or for performing a transaction is that the system obtains the token along with the standard username and password and/or PIN credentials to use to authenticate as the user. Also in this case whether a token is required or not, it is assumed that the user has the required credentials stored locally on his or her device and that the system must obtain them from the user. In cases of single factor authentication there is no token and the user may not be required to participate at all if the credentials are stored locally to the system by way of user permission and previous submission of the data. However, the user device must participate in authentication if two-factor authentication is required in order that the system has the correct and current token for successfully completing a login or transaction authentication procedure.

Figure 5:
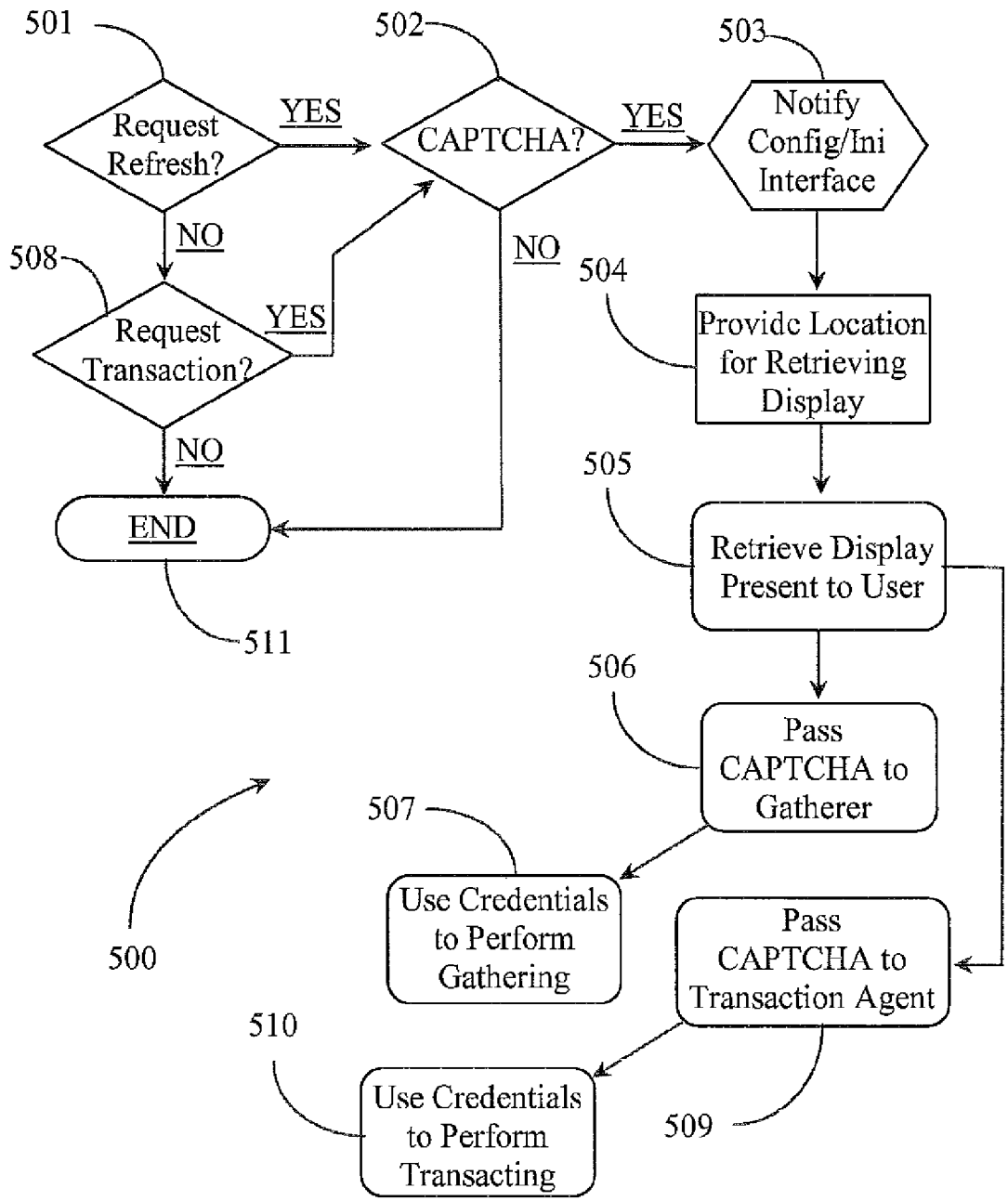
FIG. 5 is a process flow chart illustrating a two-factor authentication sequence by proxy leveraging CAPTCHA input according to an embodiment of the present invention.

Referring now to FIG. 5, a process is illustrated for two-factor authentication wherein a CAPTCHA display interaction is a second part of authentication. The process may begin with a refresh request in step 501 or with a transaction request in step 508. If in step 501, the user requests a refresh then in step 502, the system determines if there is a CAPTCHA requirement as a part of a two-factor authentication. If the system determines that there is no CAPTCHA requirement in step 502, then the process may terminate in step 511 or cycle back to step 508.

If in step 502, the system determines that a CAPTCHA requirement exists to login, then at step 503, the system notifies a configuration and initiation interface that a CAPTCHA interaction is required, and in step 504 provides the interface with the address location for receiving the display. In the meantime, the gathering SW remains in a hold state waiting for information. In step 505, the configuration and initiation interface retrieves the CAPTCHA display required by the site and presents the display to the device of the user along with the appropriate data entry box or field for the user to type in the required characters.

Assuming the process began with a refresh request in step 501, in step 506 the configuration and initiation interface passes the user-submitted CAPTCHA data to the gatherer agent. The system may have already obtained the user's credentials from the client UVP and passed that information to the gatherer. In one embodiment, the system may interrogate the user UVP via the server-side PVA instance and the user credentials are passed to the gatherer from the PVA application while the CAPTCHA data arrives at the gatherer via the configuration and initiation interface. In another embodiment, one SW transaction is used to submit the CAPTCHA data and the username password/PIN credentials to the gatherer. In any case, the gatherer agent uses the credentials and the CAPTCHA data to authenticate the user in step 507.

If the process starts with step 508 where a transaction is requested, then in step 502 the system determines if CAPTCHA is required as part of a two-factor authentication required by the site to allow the transaction. If in step 505 the system determines that CAPTCHA interaction is required then steps 503, 504, and 505 are undertaken as with the request refresh sequence. However, after the user has submitted the CAPTCHA data, the configuration and initiation interface passes at least the CAPTCHA data to the transaction agent in step 509. Since a gatherer agent is not performing a site login in this example, the configuration and initiation interface may be charged also with obtaining the user credentials from the client UVP and passing the data along with the CAPTCHA data to the transaction agent in step 509. In step 510, the transaction agent uses the credentials and CAPTCHA data to authenticate the user for the transaction.

If in step 501 no refresh is ordered and in step 508 no request for transaction is ordered, then the process may terminate at step 511 without doing anything. Where CAPTCHA is required, it may be that the system already has the standard user credentials stored locally at the server and therefore only the CAPTCHA input has to be obtained from the user. The process described in this embodiment may be combined with the process described further above concerning token requirements to produce a process that accurately determines the specific requirements of both login and transaction authentication procedures site by site and depending on the results proceeds accordingly down the tree incorporating only the required steps.

A user may initiate a refresh for all of the registered sites at one time, some of which may be two-factor authentication sites requiring CAPTCHA and some requiring token authentication. Some of the sites subject to processing may not require two-factor authentications. Sites in the latter category can also be processed using PVA assistance without departing from the spirit and scope of the present invention. The only difference being that the steps for obtaining tokens or retrieving CAPTCHA displays and presenting them to a user would not be required. Still relevant to the invention is the accessible UPV file containing all of the user's credentials stored locally in an encrypted format.

It will be apparent to one with skill in the art that the PVA service and system of the invention may be provided using some or all of the mentioned features and components without departing from the spirit and scope of the present invention. It will also be apparent to the skilled artisan that the embodiments described above are exemplary of inventions that may have far greater scope than any of the singular descriptions. There may be many alterations made in the descriptions without departing from the spirit and scope of the present invention.

What is claimed is:

1. A data gathering system, comprising:
an Internet-capable appliance associated with a user;
a Pin Vault software instance executing from a digital memory media coupled to the appliance; and
a Pin Vault file stored in a data repository coupled to the appliance, the Pin Vault file comprising data for authenticating the user to one or more third-party web sites storing information of interest to the user;
wherein the Pin Vault software cooperates with an Internet service to provide, from the Pin Vault, data as needed by the Internet service to log onto and authenticate as the user at the one or more third-party web sites storing information of interest to the user, to gather information on behalf of the user, and wherein an individual one of the third-party web sites storing information of interest to the user requires and provides a Completely Automated Public Turning Test to tell Computers and Humans Apart (CAPTCHA) display for authentication, and the Internet service captures the CAPTCHA display and provides it to the Pin Vault software which forwards it to the user, and forwards the user's input into the CAPTCHA display, as a result, to the Internet service for use in authentication at the individual third-party web site.

2. The system of claim 1 wherein the Pin Vault is encrypted, and data sent from the Pin Vault is sent as encrypted to the Internet service, which decrypts the data and discards the data after use to authenticate the user at a web site.

3. The system of claim 1 wherein the data for authenticating comprises user names and passwords associated with URLs of Internet sites.

4. The system of claim 1 wherein the data for authenticating comprises time sensitive tokens that are updated as time passes to be correct when accessed.

5. The system of claim 1 wherein the Pin Vault software comprises a user interface enabling the user to configure the information gathering activity of the Internet service.

6. The system of claim 5 wherein configuration includes adding or deleting sites to be visited by the Internet service, along with storing or deleting associated data for authentication in the Pin vault file.

7. The system of claim 5 wherein user interface includes a status window displaying current status of activity in information gathering at the Internet service.

8. The system of claim 5 wherein the interface enables the user to configure times and periods for the Internet service to access information from specific sites.

9. The system of claim 5 wherein the interface provides for displaying activity history for the information gathering.

10. A data gathering system, comprising:
an first Internet site executing, from a digital memory media coupled to the site, data-gathering software browsing to second third-party Internet sites storing information of interest to the user, logging in and authenticating as the user, and gathering information from the second third-party sites for the user; and
Pin Vault software executing on the site from the digital memory media, cooperating across the Internet network with an instance of Pin Vault software executing on an Internet-capable appliance associated with the user, accessing from a Pin Vault software instance executing from a digital memory media coupled to the appliance, authentication data from a Pin Vault file stored on the appliance;

wherein the first Internet site follows configuration by the user to gather data on behalf of the user, and wherein an individual one of the second third-party sites storing information of interest to the user requires a Completely Automated Public Turing Test to tell Computers and Humans Apart (CAPTCHA) process for authentication, and the Pin Vault software at the first Internet site captures the CAPTCHA display at the second third-party site and provides it to the Pin Vault software at the appliance with displays it to the user, and forwards the user's input into the CAPTCHA display, as a result, to the Pin Vault software at the first Internet site for use in authentication at the second third-party site.

11. The system of claim 10 wherein the Pin Vault data is encrypted at the appliance, and data retrieved from the Pin Vault at the first site is received as encrypted, which decrypts the data and discards the data after use to authenticate the user at a second web site.

12. The system of claim 10 wherein the data for authenticating comprises user names and passwords associated with URLs of Internet sites.

13. The system of claim 10 wherein the data for authenticating comprises time-sensitive tokens that are updated in the Pin Vault as time passes to be correct when accessed.

14. A data gathering method, comprising:
executing a Pin Vault software instance from a digital memory media coupled to an Internet-capable appliance, to cooperate with an Internet service to provide, from a Pin Vault stored in a data repository coupled to the appliance, data as needed by the Internet service to log onto and authenticate as the user at one or more third-party web sites storing information of interest to the user, to gather information on behalf of the user;

wherein an individual one of the third-party web sites storing information of interest to the user requires a Completely Automated Public Turing Test to tell Computers and Humans Apart (CAPTCHA) process for authentication, and the Internet service captures the CAPTCHA display and provides it to the Pin Vault software which displays it to the user, and forwards the user's input in the CAPTCHA display, as a result, to the third-party Internet service for use in authentication at the individual third-party web site.

15. The method of claim 14 wherein the Pin Vault is encrypted, and data sent from the Pin Vault is sent as encrypted to the Internet service, which decrypts the data and discards the data after use to authenticate the user at a website.

16. The method of claim 14 wherein the data for authenticating comprises user names and passwords associated with URLs of Internet sites.

17. The method of claim 14 wherein the data for authenticating comprises time sensitive tokens that are updated as time passes to be correct when accessed.

18. The method of claim 14 wherein the Pin Vault software comprises a user interface enabling the user to configure the information gathering activity of the Internet service.

19. The method of claim 18 wherein the configuration includes adding or deleting sites to be visited by the Internet service, along with storing or deleting associated data for authentication in the Pin vault file.

20. The method of claim 18 wherein user interface includes a status window displaying current status of activity in information gathering at the Internet service.

21. The method of claim 18 wherein the interface enables the user to configure times and periods for the Internet service to access information from specific sites.

22. The method of claim 18 wherein the interface provides for displaying activity history for the information gathering.

23. A method for gathering data, comprising the steps of:
executing, from a digital memory media coupled to an Internet service site, data-gathering software browsing to other third-party Internet sites storing information of interest to a particular user;

logging in and authenticating as the user, using authentication data retrieved from a Pin Vault file stored on an Internet-capable appliance associated with the user, and gathering information from the third-party Internet sites for the user; and when an individual one of the other third-party Internet sites storing information of interest to the user requires a Completely Automated Public Turing Test to tell Computers and Humans Apart (CAPTCHA) process for authentication, the Internet service site captures the CAPTCHA display and provides it to the Pin Vault software at the appliance which forwards the display to the user, and forwards the user's input in the CAPTCHA display, as a result, to the Internet service for use in authentication at the individual third-party Internet site.

24. The method of claim 23 wherein the Pin Vault data is encrypted, and data retrieved by the Internet service from the Pin Vault is received as encrypted at the Internet service, which decrypts the data and discards the data after use to authenticate the user at a web site.

25. The method of claim 23 wherein the data for authenticating comprises user names and passwords associated with URLs of Internet sites.

26. The method of claim 23 wherein the data for authenticating comprises time-sensitive tokens that are updated in the Pin Vault as time passes to be correct when accessed.

* * * * *